United States Patent
Roetcisoender et al.

(10) Patent No.: US 10,614,632 B2
(45) Date of Patent: Apr. 7, 2020

(54) MASSIVE MODEL VISUALIZATION WITH A PRODUCT LIFECYCLE MANAGEMENT SYSTEM

(71) Applicant: Siemens Product Lifecycle Management Software Inc., Plano, TX (US)

(72) Inventors: Guy Roetcisoender, Mosier, OR (US); Andreas Hugo Walter Johanssen, Ames, IA (US); Michael B. Carter, Ames, IA (US); Javeed Nizami, Plano, TX (US); Erik Anders Sjoblom, Rochester Hills, MI (US); Jianbing Huang, Shoreview, MN (US); Balaji Venkatasubramaniam, Pune (IN)

(73) Assignee: Siemens Industry Software Inc., Plano, TX (US)

( * ) Notice: Subject to any disclaimer, the term of this patent is extended or adjusted under 35 U.S.C. 154(b) by 391 days.

(21) Appl. No.: 15/075,696

(22) Filed: Mar. 21, 2016

(65) Prior Publication Data
US 2016/0314626 A1    Oct. 27, 2016

(30) Foreign Application Priority Data
Apr. 23, 2015  (IN) .............................. 447/KOL/2015

(51) Int. Cl.
*G06T 19/20* (2011.01)
*G06F 16/13* (2019.01)
(Continued)

(52) U.S. Cl.
CPC .............. *G06T 19/20* (2013.01); *G06F 16/13* (2019.01); *G06F 16/2358* (2019.01);
(Continued)

(58) Field of Classification Search
None
See application file for complete search history.

(56) References Cited

U.S. PATENT DOCUMENTS

| | | | |
|---|---|---|---|
| 4,862,376 A | 8/1989 | Ferriter et al. | |
| 4,875,162 A | 10/1989 | Ferriter et al. | |

(Continued)

FOREIGN PATENT DOCUMENTS

| | | |
|---|---|---|
| EP | 1804187 A2 | 7/2007 |
| EP | 2261827 A1 | 12/2010 |

OTHER PUBLICATIONS

Kent Tegels, "Model Your Data Hierarchies With SQL Server 2008" Microsoft Corporation, MSDN Magazine, Sep. 2008, retrieved on Feb. 12, 2014, retrieved from the Internet <URL: http://msdn.microsoft.com/en-us/ magazine/cc794278.aspx; 10 pages.

(Continued)

*Primary Examiner* — YuJang Tswei

(57) ABSTRACT

Systems and methods for massive model visualization in product data management (PDM) systems. A method includes receiving 3D rendering data for a product from a PDM server system by a visualization data server (VDS) on a PDM client system network. The method includes synchronizing and updating the 3D rendering data by the VDS according to changes on the PDM server system. The method includes computing spatial hierarchies from the 3D rendering data by the VDS. The method includes serving the 3D rendering data, by the VDS, to at least one rendering machine on the PDM client system network.

15 Claims, 3 Drawing Sheets

(51) Int. Cl.
*G06F 16/27* (2019.01)
*G06F 16/23* (2019.01)
*G06T 1/20* (2006.01)

(52) U.S. Cl.
CPC .............. *G06F 16/27* (2019.01); *G06T 1/20* (2013.01); *G06T 2210/61* (2013.01); *G06T 2219/2016* (2013.01)

(56) References Cited

U.S. PATENT DOCUMENTS

| | | | |
|---|---|---|---|
| 6,057,847 | A | 5/2000 | Jenkins |
| 6,118,456 | A | 9/2000 | Cooper et al. |
| 6,377,263 | B1 | 4/2002 | Falacara et al. |
| 6,742,043 | B1* | 5/2004 | Moussa ............ G06F 17/30569 707/E17.006 |
| 6,898,560 | B1 | 5/2005 | Das |
| 6,933,946 | B1 | 8/2005 | Silva et al. |
| 7,127,308 | B2 | 10/2006 | Bigelow |
| 7,583,263 | B2 | 9/2009 | Huang et al. |
| 7,617,444 | B2 | 11/2009 | Rothschillwe et al. |
| RE41,476 | E | 8/2010 | Muehleck et al. |
| 8,046,379 | B1 | 10/2011 | Yu et al. |
| 8,725,763 | B2 | 5/2014 | Huang |
| 9,053,254 | B2 | 6/2015 | Carter et al. |
| 9,413,807 | B1* | 8/2016 | Sherman ................. H04L 67/02 |
| 2002/0004710 | A1 | 1/2002 | Murao |
| 2002/0035463 | A1 | 3/2002 | Lynch et al. |
| 2002/0162081 | A1 | 10/2002 | Solomon |
| 2002/0184246 | A1 | 12/2002 | Shkolnik |
| 2004/0117393 | A1 | 6/2004 | DeMesa et al. |
| 2004/0210546 | A1 | 10/2004 | Spooner et al. |
| 2005/0071135 | A1* | 3/2005 | Vredenburgh ...... G06F 17/5004 703/1 |
| 2005/0223320 | A1 | 10/2005 | Brintzenhofe et al. |
| 2006/0074609 | A1 | 4/2006 | Freeman et al. |
| 2006/0098009 | A1 | 5/2006 | Luniga |
| 2006/0173873 | A1 | 8/2006 | Prompt et al. |
| 2007/0013709 | A1 | 1/2007 | Charles et al. |
| 2007/0033204 | A1 | 2/2007 | Callahan |
| 2007/0159480 | A1 | 7/2007 | Delarue et al. |
| 2008/0077365 | A1 | 3/2008 | Fukumura |
| 2008/0183730 | A1 | 7/2008 | Enga |
| 2008/0184185 | A1 | 7/2008 | Saelzer et al. |
| 2009/0016598 | A1 | 1/2009 | Lojewski |
| 2009/0070368 | A1 | 3/2009 | Callahan |
| 2009/0106530 | A1 | 4/2009 | Lauterbach |
| 2009/0182972 | A1 | 7/2009 | Greiner et al. |
| 2009/0187732 | A1 | 7/2009 | Greiner et al. |
| 2010/0057729 | A1 | 3/2010 | Fitt |
| 2010/0114355 | A1 | 5/2010 | Harashima et al. |
| 2010/0198383 | A1 | 8/2010 | Richey |
| 2010/0235146 | A1 | 9/2010 | Bennett et al. |
| 2011/0167398 | A1 | 7/2011 | Furumoto |
| 2011/0178787 | A1 | 7/2011 | Patankar et al. |
| 2011/0179090 | A1 | 7/2011 | Sivaram et al. |
| 2011/0225183 | A1 | 9/2011 | Rezayat |
| 2012/0101918 | A1 | 4/2012 | Battle et al. |
| 2012/0215730 | A1 | 8/2012 | Collier et al. |
| 2013/0080477 | A1 | 3/2013 | Evans et al. |
| 2013/0080478 | A1 | 3/2013 | Ben-Haim et al. |
| 2013/0132373 | A1 | 5/2013 | Huang et al. |
| 2013/0132432 | A1* | 5/2013 | Carter ..................... G06F 17/50 707/770 |

OTHER PUBLICATIONS

Estublier et al.; "Toward SCM/ PDM Integration?", University of Grenoble, ECOOP '98 Proceedings of the SCM-8 Symposium on System Configuration Management, 1998, retrieved on Feb. 12, 2014, retrieved from the Internet <URL:http://pdfaminer.org/000/578/207/toward_scm_pdm_integration.pdf>; 19 pages.

Tom Haughey, "Modeling Hierarchies", Association With the Meta-Data and Data Modeling Summit, Jun. 14-16,2005, Long Beach, New Jersey, Retrieved from the internet on Feb. 12, 2014, <URL:http://www/tdan.com/view-special-features/5400/; 6 pages.

Koo et al.; "Feasibility Study of 4D CAD in Commercial Construction", CIFE Technical Report #118, Aug. 1998, etrieved on Feb. 12, 2014, <URL: http://cife.stanford.edu/sites/default!files/TR118.pdf>, 135 pages.

"Massive Model 3d Navigation with Right Hemisphere's Deep Vision file format"; Aug. 9, 2011, Printed from internet; http://rhdeepexploration.wordpress.com/2011/08/09/massive-model-3d-navigation-with-right-hemispheres-deep-vision-file-format/; 6 pages.

Regli, et al., "Managing Digital Libraries for Compter-Aided Design", 2000, Computer-Aided Design, Elsevier, vol. 32, 14 pages.

John C. Hart, "Chapter 11—Procedural Synthesis of Geometry", In: F. Kenton Musgrave, "Texturing & Modeling", ISBN: 1-55860-848-6, 2003, San Francisco, CA, 684 pages in 9 parts.

Rubin et al., "A 3-Dimensional Representation for Fast Rendering of Complex Scenes", ComputerGraphics Proceedings, Proceedings of Siggraph Annual International Conference on Computer Graphics, vol. 14, No. 3, Jan. 1, 1980, 7 pages.

Gobbelli et al., "Technical Strategies for Massive Model Visualization", Proceedings of the 2008 ACM Symposium on Solid and Physical Modeling, New York 2008, 11 pages.

Kasik, "Visibility-Guided Rendering to Accelerate 3D Graphics Hardware Performance"; ACM SIGGRAPH (2007) courses; 25 pages.

Kasik et al.., "Course Notes: Massive Model Visualization Techniques", 2008 ACM, SIGGRAPH 2008 classes, 188 pages.

Kasik et al.L., "Real Time Interactive Massive Model Visualization", Eurographics 2006; Tutorials, 20 pages.

Deitrich et al., "Massive-Model Rendering Techniques", IEEE Computer Graphics and Applications, Nov./ Dec. 2007, 15 pages.

Gecevska, et al., "Product Lifecycle Management Through Innovative and Competitive Business Environment", Oct. 2010, Journal of Industrial Engineering and Management (JIEM), vol. 3, Issue 2, 14 pages.

Sampaio et al., "Towards a Logical Multidimensional Model for Spatial Data Warehousing and OLAP", Nov. 10, 2006, ACM, DOLAP 2006, 8 pages.

Frehner et al., "Virual Database: Spatial Analysis in a Web-Based Data Management System for Distributed Ecological Data", Jul. 11, 2006, Elsevier, Environmental Modelling and Software, Issue 21, 11 pages.

* cited by examiner

MASSIVE MODEL VISUALIZATION WITH A PRODUCT LIFECYCLE MANAGEMENT SYSTEM

CROSS-REFERENCE TO OTHER APPLICATIONS

This application claims priority to India Patent Application 447/KOL/2015, filed Apr. 23, 2015, and hereby incorporated by reference. This application includes some subject matter in common with India Patent Application 1486/KOL/2011, filed Nov. 23, 2011; U.S. Pat. No. 8,725,763, filed Sep. 7, 2012 and issued May 13, 2014, titled "Massive Model Visualization with Spatial Indexing"; U.S. Patent Publication 2013/0132373, filed Sep. 7, 2012 and published May 23, 2013, titled "Massive Model Visualization with Spatial Retrieval"; and U.S. Pat. No. 9,053,254, filed Sep. 7, 2012 and issued Jun. 9, 2015, titled "Massive Model Visualization in PDM Systems", each of which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include systems and methods for improved PDM processes, including high performance visualization of massive models authored and managed in a PDM system. A method includes receiving 3D rendering data from a PDM server system by a visualization data server (VDS) on a PDM client system network. The method includes synchronizing and updating the 3D rendering data by the VDS according to changes on the PDM server system. The method includes computing spatial hierarchies from the 3D rendering data by the VDS. The method includes serving the 3D rendering data, by the VDS, to at least one rendering machine on the PDM client system network. The changes on the PDM server system can be model changes managed by the PDM server system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
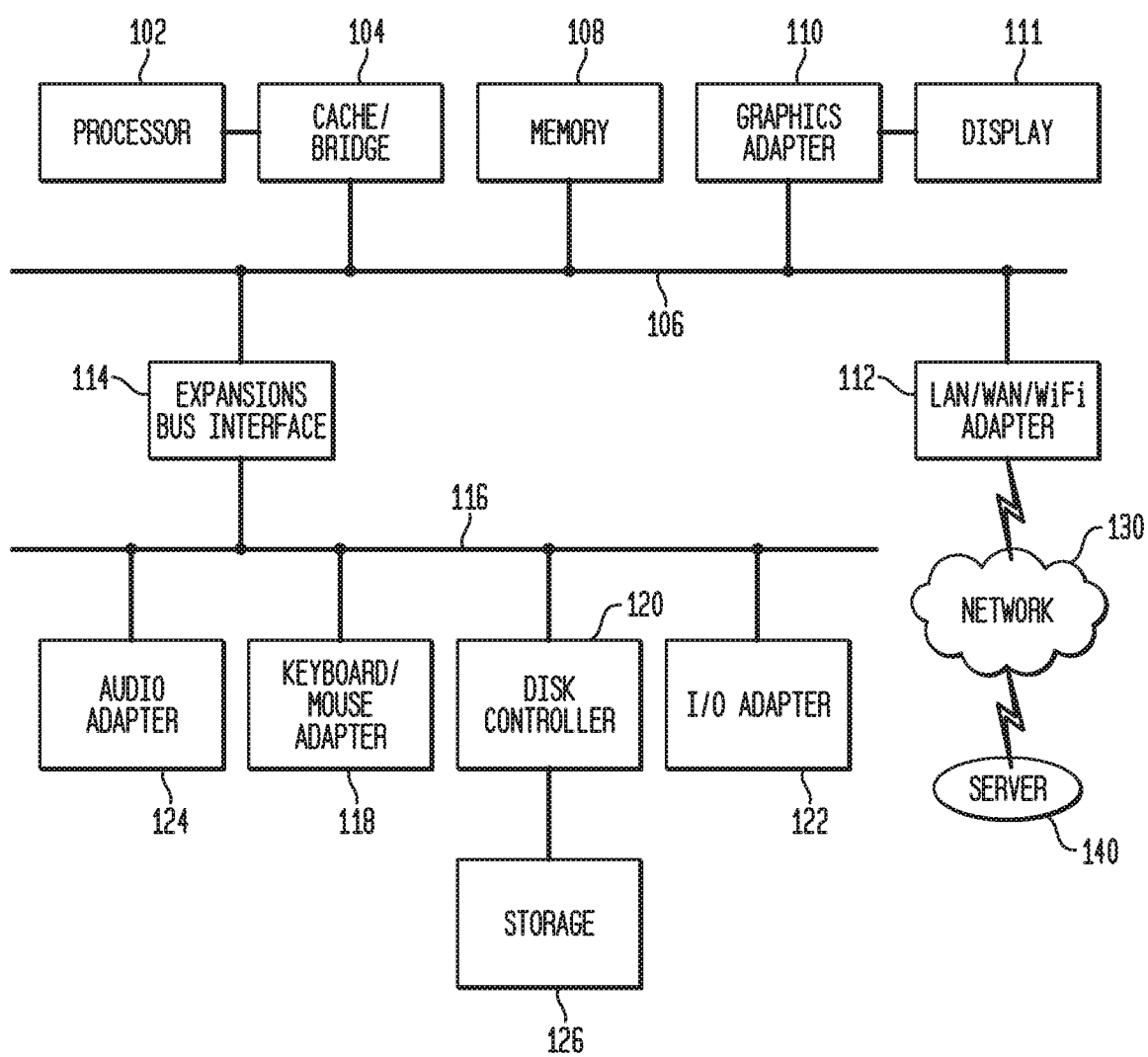
FIG. 1 depicts a block diagram of a data processing system in which an embodiment can be implemented.
Figure 2:
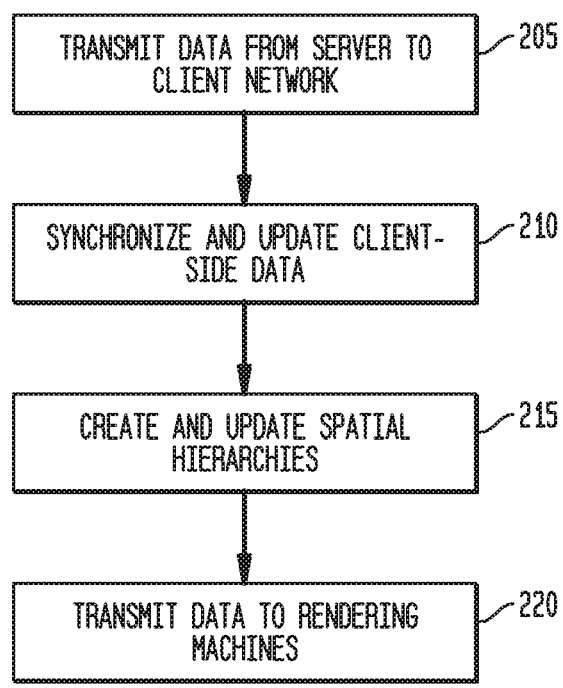
FIG. 2 illustrates a flowchart of a process in accordance with disclosed embodiments.
Figure 3:
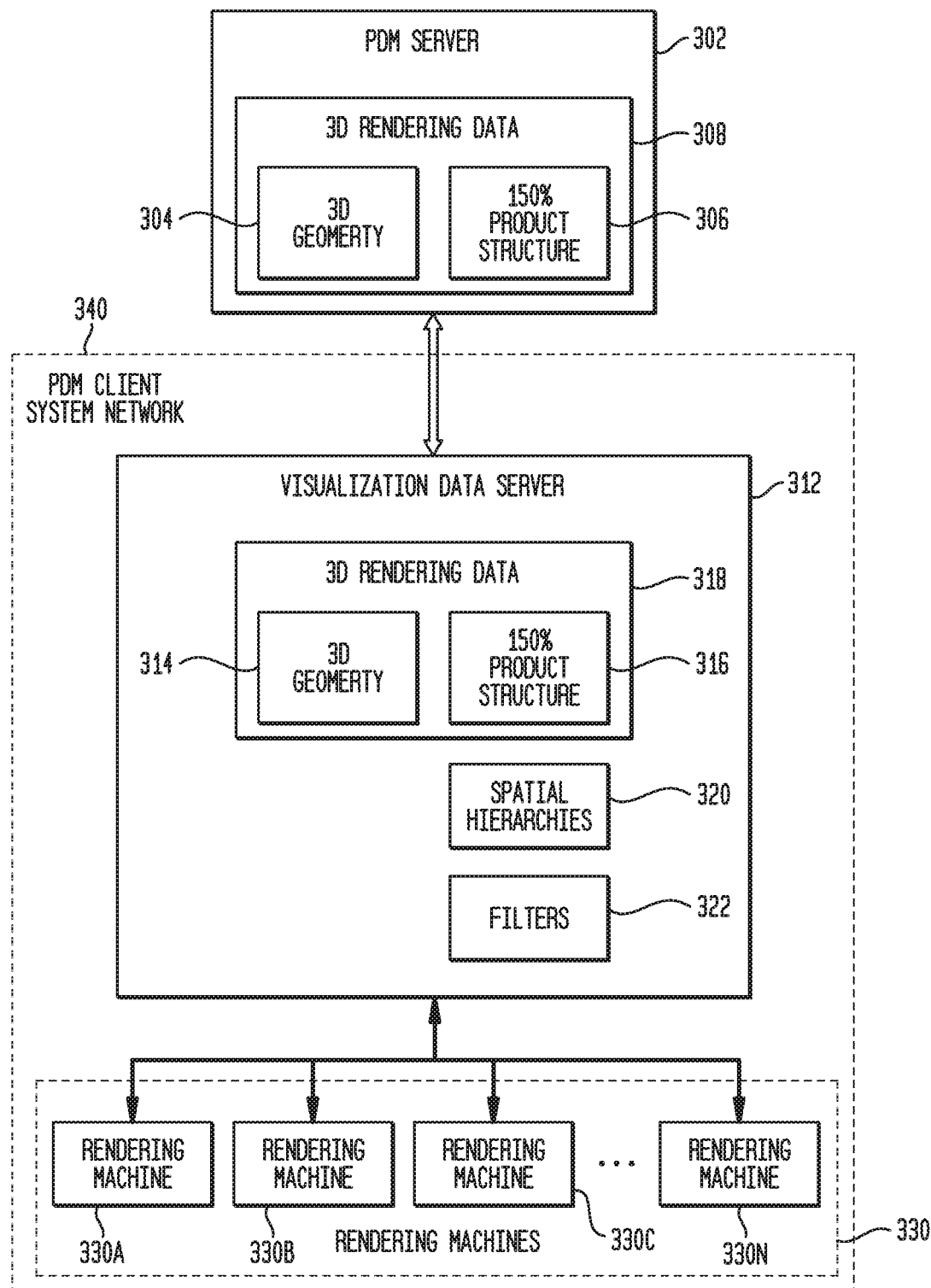
FIG. 3 illustrates an embodiment of a disclosed system and method.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Massive Model Visualization (MMV) systems are able to render models with millions of parts by identifying the (typically small) subset of part occurrences that is actually needed to produce a correct image. Visibility-guided rendering (VGR) algorithms traverse a pre-computed spatial structure in order to determine which occurrences are potentially visible from a given eye point in an efficient manner.

It is a valuable and typical practice to model products, factories and other complex entities composed of many constituents into a hierarchical structure of reusable elements. Examples of reusable elements include parts and assemblies, logical systems, fasteners, welds, and factory cells. A single element can be instantiated many different times in a structure. Each instantiation represents a different usage of the same identically defined element and is referred to as an "occurrence" of that element. For example, a car may have four identical wheels. There is a single definition of the wheel, but it is instantiated four times in the product structure of that car. There are, therefore, four wheel occurrences in the car corresponding to the front left, front right, rear left, and rear right wheels; each of these occurrences can also have geometric or spatial information indicating the location of the element in the vehicle.

The ability to model each occurrence explicitly and associate unique data to it while retaining the cohesiveness of the common definition element has been one of the key innovations in product structure management in recent years. The powerful features supported by an occurrence based model include the ability to define and scope specific information about the usage of an element to the exact context it applies and to work within nested contexts that override data from lower level to higher level contexts. An occurrence, as used herein, represents a path through such a product data model of an assembly to a specific node in its proper context, including all parent nodes.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system 100 depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network (WAN)/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments can use an external component that fetches data local in an offline manner and can use an in-memory model for product structure. Disclosed embodiments are high performance and can include features such as: pre-fetching all visualization data locally in an offline process prior to supporting MMV render requests; high performance binary file formats such as .mmp and .mmv (described in more detail below); an in-memory product structure model with bitmask based configuration; a high performance protocol between the viewer and the Visualization Data Server; visibility-guided rendering in the viewer via a spatial hierarchy to load only visible geometry; and late-loading of the geometric (e.g., JT) data necessary to complete the rendering (JT file streaming). The spatial hierarchy can be a hierarchy of the spatial locations of each element in the product structure. JT, as used herein, refers to the 3D data format developed by Siemens Product Lifecycle Management Software Inc. (Plano, Tex.) and used for product visualization, collaboration, and computer aided drafting (CAD) data exchange. JT data can contain any combination of approximate (faceted) data, boundary representation surfaces (NURBS), Product and Manufacturing Information (PMI), and Metadata (textual attributes) either exported from the native CAD system or inserted by a PDM system. While specific implementation examples are described herein in terms of JT data, those of skill in the art will recognize that other file types and data structures can be used in the disclosed processes.

Disclosed embodiments can enable high performance visualization with product data managed by a PDM system. PDM systems have traditionally been challenged with delivering high performance visualization in a configured product structure environment. Traditional performance challenge areas have been dynamic solve of large structures stored in the database (DB), retrieval of properties, access checking/data authorization, and transmission of large product structure and JT geometry data to the client. These are all done on demand when users request visualization, and the entire process takes several minutes to complete for medium sized models, and sometimes cannot complete for massive models. For massive models, this implies hundreds of megabytes of product structure data and multiple gigabytes of geometry data must be downloaded from the server to the render component. Disclosed embodiments gather this structure metadata and geometry information in an offline manner and then have it readily available when viewer requests come in. The PDM system is consulted on how to properly do the structure solve, authorization, and load, but the actual solve and access checking can be done by the VDS on or near the client based on the previously downloaded structure and geometry data.

Disclosed embodiments can configure a specific, massive product (e.g., revision, unit number, and options) managed in a PDM system that the user wishes to visualize. Disclosed embodiments can interactively render the complete 3D model in less than 30 seconds (e.g. walk up to the model) regardless of model size. Aircraft, ships, and factories are all examples of the size and scale of target models, though other products or objects and other size models can be used in disclosed embodiments. Disclosed embodiments can interactively navigate the complete 3D model (e.g. view, rotate, zoom, hide, fly through, and otherwise). Disclosed embodiments can interrogate the model (e.g. measure, section, view PMI, view properties, markup). Disclosed embodiments can support both client-based rendering and remote rendering based deployments in a multi-user environment.

Disclosed embodiments can load a spatial hierarchy into the client rendering machine to estimate visibility without loading the product structure and can configure occurrences in the spatial hierarchy only for parts determined to be visible according to a specified viewpoint or selection (visible occurrence queries).

In various embodiments, product metadata can be managed in a customer datacenter. The components within the data center can be on a high performance LAN; however, the clients that interface with this data center can be on a WAN or LAN. The rendering components themselves can be deployed on a WAN or LAN relative to the data center containing the product metadata.

Disclosed embodiments include a perpetually-updating local structure and geometry cache. The system can co-locate the occurrence data along with the geometry data (which are both very large) local to the renderer on a LAN. According to various embodiments, dynamic structure solve, property retrieval, and access checking are no longer done by the PDM server directly (which can be on a WAN relative to the renderer), but instead it can be done jointly by the PDM server and a new server component (the Visualization Data Server (VDS)) that is co-located on the local LAN relative to the renderer.

Various embodiments can include a high performance in-memory bitmask-based structure solve with cached read expressions for access checking done by VDS (a structure server). This provides very high numbers of configured occurrences per second during the visible occurrence queries, which removes the main bottleneck from initial design. The same underlying MMV approach can be used for both online (PLM) and offline (local file system) based data. The same underlying serialization technology can be used for both file system and network based occurrence data transfers. In various embodiments, a bitmask-based configuration can be used when the product structure is exported and indexed so that information is recorded in the structure representing specific configuration aspects such as variant rule, unit effectivity, revision rule, etc. When the indexed structure needs to be configured for a specific revision rule, variant rule, and unit or data effectivity, or other factor, the PDM system or VDS can use a "bitmask" filter to apply to each line in order to configure it. As the structure in the index is expanded, lines where the variant rule, effectivity, or other information do not match what is specified in the bitmask are filtered out.

Disclosed embodiments can continuously move all data pertinent to 3D rendering as close to the rendering component as possible. This can be done in an offline manner so it is available when rendering is requested by the user.

FIG. 2 illustrates a flowchart of a process in accordance with disclosed embodiments that can be performed by one or more PDM or PLM data processing systems as disclosed herein, referred to generically as the "system" below. FIG. 3 illustrates a network architecture in which various embodiments can be implemented. Each of the server and machine elements of FIG. 3 can be implemented, for example, as a data processing system 100 described above.

The system, such as visualization data server (VDS) 312, receives 3D rendering data 308 for a product from the PDM server system 302 to bring the 3D rendering data 308 within close proximity to the rendering machines 330A-330N components (205). "Close proximity," in this context, refers to a fast, local connection, such as on a high performance LAN, illustrated here as PDM client system network 340. This process can be performed in an offline manner. 3D rendering data 308 can include, for example, 150% product structure data 306 (including any product structure metadata or other corresponding data) and 3D geometry data 304. The PDM server system 302 transmits this 3D rendering data 308 to the PDM client system network 340. A "150% product structure" and similar terms are used herein to refer to a set of unconfigured PDM data that includes variants and options that can be later queried or otherwise processed to produce the configured data for specific variants of the product, including any relevant bill of material (BOM) data and 3D geometry data.

The system synchronizes and keeps this data (local 3D rendering data 318 including 3D geometry 314 and 150% product structure 316) up-to-date with the master PDM-server-system managed 3D rendering data 308 via an incremental update (210). The system synchronizes and updates the client-side data.

The system computes spatial hierarchies 320 from the cached/local 3D rendering data 318 to enable MMV rendering and keeps these spatial structures up to date (215).

The system serves this data to multiple rendering machines 330A-330N and processes this data in a very high performance manner to enable high performance visualization of very large 3D data on the rendering machines 330A-330N (220). The PDM server system 302 or the PDM client system (such as VDS 312) can perform these actions. Note that one or more of the rendering machines 330A-330N may also be referred to as rendering machine(s) 330, and rendering machines 330A-330N can be implemented as any number of rendering machines 330. Note that, in various embodiments, a user of any of the disclosed systems can interact with any of the other systems (depending on roles, authorizations, and other security measures). In this way, for example a user of a rendering machine 330 can identify products on the PDM server system 302 that should be available for MMV processing as disclosed herein, and the user is not required to interact with PDM server system 302 directly to accomplish this.

As illustrated in the example of FIG. 2, an administrator can configure a set of products to be MMV enabled, such as by interacting with PDM server system 302. The 3D rendering data 308, which includes, in this example, 150% product structure data 306 and 3D geometry data 304 (such as JT files), for these products is transmitted to VDS 312 and cached locally as local 3D rendering data 318 including 3D geometry 314 and 150% product structure 316. The local 3D rendering data 318 is then transferred locally to the rendering machines 330A-330N, and kept up to date as changes are made by PDM server system 302.

Spatial hierarchies 320 are computed from the structures 316 and 3D geometry data 314 and stored local to the rendering machines 330 on VDS 312, prepared ahead of time. A spatial hierarchy for a given configuration is loaded to a rendering machine 330 to initiate render. During the rendering process, cell queries from any one of the rendering machines 330 to the VDS 312 will configure the 100% configured product structure on the fly locally to avoid WAN based network bottlenecks during rendering. The spatial cell queries can be based on the spatial hierarchies 320 and any filters 322 (including bitmask-based filters).

The 150% product structure in this example represents a given revision rule, with a finite set of variant rules for the automotive case. For aerospace, it is a single revision rule with a finite set of unit number effectivities. Local bitmask based configuration will be used to fully configure this structure.

The VDS 312 relies on the PDM server system 302 for the (partially) configured product structure definitions and to provide any delta updates to the structure as time progresses in order to keep the local 150% product structure 316 up to date. The delta updates typically reflect product changes due to editing operations. This embodiment will support both remote render based deployments and client based deployments.

In various embodiments, a full text search (FTS) indexing system of the PDM server system 302 can be used to index data for MMV. As used herein, the "mmp" or ".mmp" file refers to a file that contains the actual product structure. The product structure information can be communicated from the PDM server to VDS via ".mmp" files. In some cases, the mmp file is used to record the product structure information that is indexed. The mmp file can include the 150% product as a concise, binary product structure file that includes such elements as nodes, bounding boxes, revision rules, and read expressions, but the structure is unconfigured with regards to variants or effectivity. The file format is very concise and binary to provide maximum performance. The Flatbuffer serialization technique developed by Google can be used, in some cases, to serialize the data in a very high performance implementation. The indexing system is capable of initial product indexing as well as computation of deltas that only capture changes to the product data on a periodic basis. The system is designed for incremental update, so periodic polling is done to get changes from PDM server system 302 and apply them to VDS 312. An mmp "delta" collection in the PDM system is used to capture the initial index along with all the updates (the "deltas"). Access Control read expressions are included in the MMP file to allow the VDS 312 to perform access control checks locally.

VDS 312 can operate as a daemon process servicing many simultaneous requests. The VDS 312 gets the product data structure files for all structures indexed for MMV from PDM server system 302, and loads these into its local in-memory product structure model. This model is also 150% structure. Keeping the structure in memory allows for rapid application of delta updates, along with high performance read and bitmask based configuration operations.

Once the structure is loaded into memory, 3D geometry (e.g., JT files) can be downloaded. To accommodate this, the PDM server system 302 can use a "ticket" mechanism. The PDM server system 302 issues a "ticket" for a particular file, and this ticket can be used to communicate with the PDM system volume to retrieve the file (or segments of the file in this case). A ticket cache is maintained in VDS for all users, and is kept up to date periodically. Once tickets are available, JT file segments are pulled local to the VDS into the JT file segment cache of the File Management System Client Cache (FCC). Segments containing the header, table of contents, and logical scene graph for each part are retrieved so geometry is local to the viewer before render requests are made by users.

Once the structure and geometry data is local, it can be used to create a spatial hierarchy for MMV. This spatial hierarchy is used by the rendering algorithms to determine which portions of the model are visible for a given visualization rendering request.

The VDS 312 is now ready to support rendering, but it must keep itself up to date with the PDM system. It does this by periodically polling the PDM server system 302 for incremental updates. When updates are found, they are downloaded as delta mmp files, and applied to the in-memory product structure model. Note that this exemplary embodiment is a "pull model" indexing system. This allows for VDS processes to be added when and where they are needed, local to viewers, to enable high performance MMV.

At this point all necessary data is local to the VDS 312, and the viewer can leverage this for high performance MMV visualization. As users select objects from the PDM server system 302 for MMV visualization, they typically first configure them for revision rules, variants, and/or effectivity. Before the VDS can be leveraged, a check must be made with the PDM server system 302 to ensure the product configuration requested is being actively indexed by the system. If it is, the appropriate configuration bitmasks for variants and effectivity are returned to the viewer. Once this and the user information is known, the viewer tries to contact a local VDS and enable MMV rendering from the PDM server system 302. This is part of the viewer—VDS initialization process, and the user and bitmask information is sent to the VDS 312 upon initialization. Immediately following initialization, the spatial hierarchy (which can be stored as an .mmv file) is requested from the VDS 312, and MMV rendering commences.

The disclosed MMV rendering can use a technique called visibility guided rendering where the .mmv spatial hierarchy is traversed to get an estimate of which parts of the model are visible for a given view frustum, such as described in the patent documents incorporated by reference above. This is done in the render process itself. Once the visible spatial cells are estimated, a request is made to the VDS 312 to "configure the occurrences for spatial cells". This is sometimes called the cell queries. In order to support proper product data configuration, the configuration bitmasks are used to configure the structure. In various embodiments, only occurrences that are configured according to the configuration bitmasks are returned to the viewer during the MMV rendering process. However, before returning anything to the viewer, access control checking must be done for the particular user of interest. This can be done by using the current user's session information (user, group, role, etc.), and previously cached read expressions sent over in the .mmp file to evaluate access on each line in the structure. In this way, proper user authorization is provided.

During the rendering process, JT file segments are streamed from the local JT file segment cache. Since these segments have been previously downloaded by VDS 312, the performance is similar to a local file load operation. Only the necessary JT file segments are loaded during the rendering process.

Finally, to support user operations such are picking, selection, and logical visibility, product structure information is needed and loaded into the viewer from the VDS. This can also go through the access control checking process.

The disclosed system is very high performance, and this is achieved using features such as: pre-fetching all visualization data locally in an offline process prior to supporting MMV render requests; high performance binary file formats such as .mmp and .mmv; in-memory product structure model with bitmask based configuration; high performance protocol between the viewer and the VDS 312; visibility guided rendering in the viewer via a spatial hierarchy to load only visible geometry; and late loading on the JT data necessary to complete the rendering (JT file streaming).

Another feature of disclosed systems and methods is deployment flexibility. The VDS component is intended to be deployed close to a viewer (rendering) process on a rendering machine, regardless of where viewers are deployed in an enterprise.

While the example of FIG. 3 illustrates a single VDS serving multiple rendering machines, other embodiments can include one visualization data server per render machine, a single VDS "shared" by multiple rendering machines, multiple local client system network sites each with one or more VDS processes or rendering machines, where each site communicates with the same PDM server, multiple PDM servers at geographically separated locations that each communicate with one or more VDS processes and rendering machines, and other combinations of the elements discussed herein.

Various embodiments include a specialized component used to cache or index visualization data for accelerated performance. Various embodiments include a specialized component used to configure product data rapidly using means other than those typically found in PDM system such as database solve. Various embodiments include "visibility guided rendering" or "massive model visualization." Various embodiments include very high performance visualization software with data stored in PDM system. Various embodiments include forward deployed visualization caches.

Of course, those of skill in the art will recognize that, unless specifically indicated or required by the sequence of operations, certain steps in the processes described above may be omitted, performed concurrently or sequentially, or performed in a different order.

Various aspects of the disclosed techniques can, but are not required to, be implemented using systems and methods described in the patent documents incorporated by reference above.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method for massive-model visualization, comprising:
receiving three-dimensional (3D) rendering data for a product from a product data management (PDM) server system by a visualization data server (VDS) on a PDM client system network;
synchronizing and updating the 3D rendering data by the VDS according to changes on the PDM server system;
computing spatial hierarchies from the 3D rendering data by the VDS;
serving the computed spatial hierarchies, by the VDS, to at least one rendering machine on the PDM client system network, including dynamically configuring the product according to cell queries received from the at least one rendering machine on the PDM client system network, wherein the 3D rendering data is cached on the VDS from the PDM server system and is served by the VDS to multiple rendering machines.

2. The method of claim 1, wherein the 3D rendering data includes a 150% product structure and geometry data.

3. The method of claim 1, wherein the PDM server system implements a full text search indexing system.

4. The method of claim 1, wherein the VDS gets product data structure files for all structures indexed for visualization from the PDM server system and loads the product data structure files into an in-memory product structure model on the VDS.

5. The method of claim 1, wherein the VDS periodically polls the PDM server system for updates to the 3D rendering data.

6. A visualization data server (VDS) on a product data management (PDM) client system network comprising:
at least one processor; and
an accessible memory, the VDS configured to:
receive three-dimensional (3D) rendering data for a product from a PDM server system;
synchronize and update the 3D rendering data according to changes on the PDM server system;
compute spatial hierarchies from the 3D rendering data;
serve the computed spatial hierarchies to at least one rendering machine on the PDM client system network, including dynamically configuring the product according to cell queries received from the at least one rendering machine on the PDM client system network, wherein the 3D rendering data is cached on the VDS from the PDM server system and is served by the VDS to multiple rendering machines.

7. The VDS of claim 6, wherein the 3D rendering data includes a 150% product structure and geometry data.

8. The VDS of claim 6, wherein the PDM server system implements a full text search indexing system.

9. The VDS of claim 6, wherein the VDS gets product data structure files for all structures indexed for visualization from the PDM server system and loads the product data structure files into an in-memory product structure model on the VDS.

10. The VDS of claim 6, wherein the VDS periodically polls the PDM server system for updates to the 3D rendering data.

11. A non-transitory computer-readable medium encoded with computer-executable instructions that, when executed, cause a visualization data server (VDS) on a product data management (PDM) client system network to:
  receive three-dimensional (3D) rendering data for a product from a PDM server system;
  synchronize and update the 3D rendering data according to changes on the PDM server system;
  compute spatial hierarchies from the 3D rendering data;
  serve the computed spatial hierarchies to at least one rendering machine on the PDM client system network, including dynamically configuring the product according to cell queries received from the at least one rendering machine on the PDM client system network, wherein the 3D rendering data is cached on the VDS from the PDM server system and is served by the VDS to multiple rendering machines.

12. The non-transitory computer-readable medium of claim 11, wherein the 3D rendering data includes a 150% product structure and geometry data.

13. The non-transitory computer-readable medium of claim 11, wherein the VDS periodically polls the PDM server system for updates to the 3D rendering data.

14. The non-transitory computer-readable medium of claim 11, wherein the PDM server system implements a full text search indexing system.

15. The non-transitory computer-readable medium of claim 11, wherein the VDS gets product data structure files for all structures indexed for visualization from the PDM server system and loads the product data structure files into an in-memory product structure model on the VDS.

* * * * *